United States Patent [19]

Nakada et al.

[11] Patent Number: 5,656,789
[45] Date of Patent: Aug. 12, 1997

[54] ELECTRONIC MUSICAL INSTRUMENT HAVING A FUNCTION TO INDICATE KEYS TO BE OPERATED

[75] Inventors: Akira Nakada; Yasuo Nagahama; Takeo Shibukawa; Masanobu Chihana; Tatsuhiro Koike, all of Hamamatsu, Japan

[73] Assignee: Yamaha Corporation, Japan

[21] Appl. No.: 421,800

[22] Filed: Apr. 13, 1995

[30] Foreign Application Priority Data

Apr. 15, 1994 [JP] Japan .................................. 6-102222

[51] Int. Cl.⁶ ........................................................ G09B 15/02
[52] U.S. Cl. .................................... 84/477 R; 84/478
[58] Field of Search ............................ 84/470 R, 477 R, 84/478

[56] References Cited

U.S. PATENT DOCUMENTS

| | | | |
|---|---|---|---|
| 4,378,720 | 4/1983 | Nakada et al. | 84/478 X |
| 4,703,681 | 11/1987 | Okamoto | 84/478 |
| 5,183,398 | 2/1993 | Monte et al. | 84/478 X |
| 5,392,682 | 2/1995 | McCartney-Hoy | 84/478 X |

FOREIGN PATENT DOCUMENTS

| | | |
|---|---|---|
| 56-52788 | 5/1981 | Japan . |
| 63-18752 | 4/1988 | Japan . |
| 6-27970 | 4/1994 | Japan . |

*Primary Examiner*—Stanley J. Witkowski
*Attorney, Agent, or Firm*—Graham & James LLP

[57] ABSTRACT

Indicators are provided in corresponding relations to individual keyboard keys. For each of plural phrases of a given music piece, information is supplied that represents at least the highest-pitch note to the lowest note in the phrase. During performance of the music piece and on the basis of the supplied information, the indicators, for each phrase, indicates all notes within a range from the highest-pitch note to the lowest note of the phrase. Thus, the player can easily position his hands over accurate keys and thereby can comfortably carry out performance operations for each phrase. Notes to be performed in each phrase after a first note corresponding to predetermined performance timing in the phrase may be indicated in different manners (for example, by varying degrees of brightness) depending on performance timing differences, from the first note performance timing, of the notes. Alternatively, individual notes of each phrase may be sequentially indicated quickly in advance of the actual phrase performance. These modifications allow the player to intuitively recognize the order of performance. Further, by indicating at least one of the current and next notes in a manner different from other notes, it is advantageously shown very visibly which notes should be performed now and next.

25 Claims, 14 Drawing Sheets

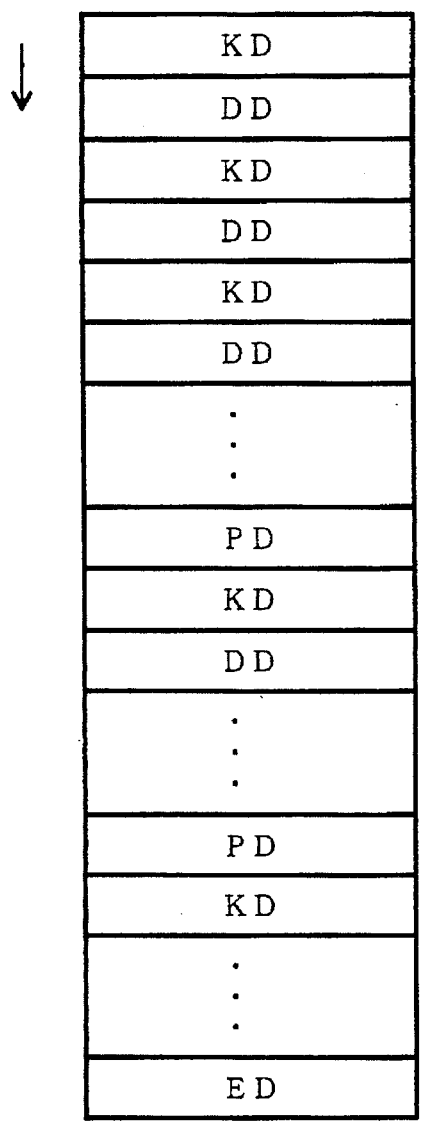
F I G. 3 A
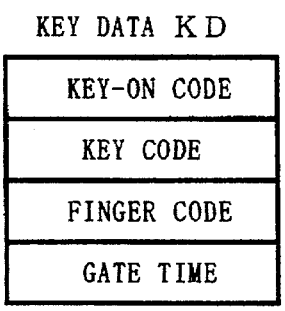
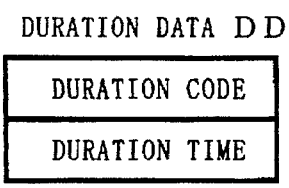
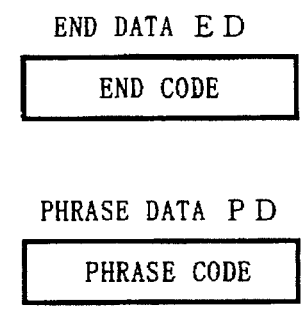
F I G. 3 B

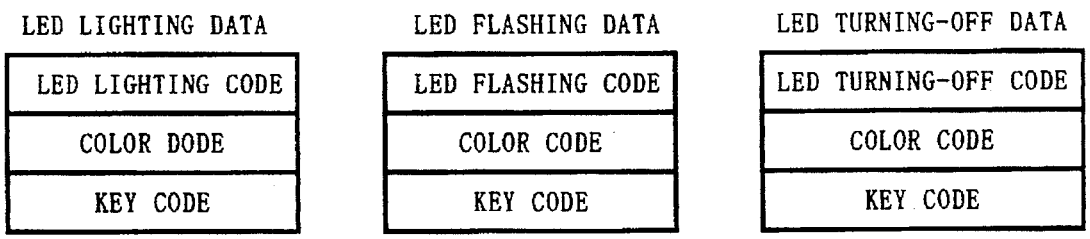
F I G. 4 A
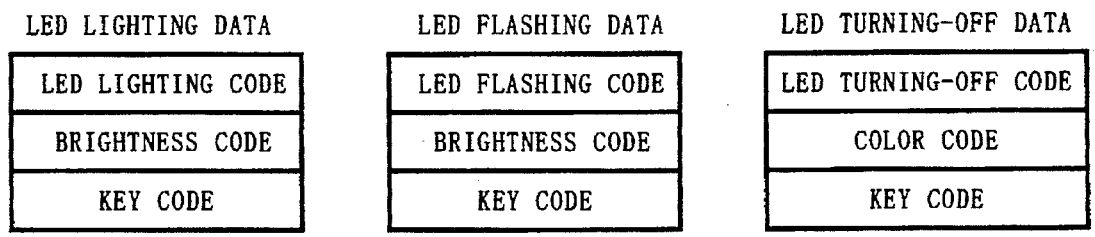
F I G. 4 B

ELECTRONIC MUSICAL INSTRUMENT HAVING A FUNCTION TO INDICATE KEYS TO BE OPERATED

BACKGROUND OF THE INVENTION

This invention relates to an electronic musical instrument which has a function to clearly indicate performance operators (typically, Keyboard keys) to be operated to a player and thereby allows the player to do performance practice on the instrument in an effective manner.

Electronic musical instruments, such as those having a keyboard, are conventionally known which, in accordance with predetermined performance timing of an automatic performance, sequentially visibly indicate or display operators to be worked or operated to a player by use of lamps, LEDs or other suitable means. Some of such musical instruments indicate keys to be depressed by lighting LEDs provided in corresponding relations with the keys in accordance with predetermined performance timing of an automatic performance and thereby visibly inform the player which keys are to be depressed. By sequentially depressing the thus-indicated keys, the player can do performance practice on the musical instrument.

An electronic musical instrument of the above-mentioned type is disclosed for example in Japanese Patent Publication No. SHO 63-18752. The disclosed technique attempts to permit more effective performance practice by indicating, for each phrase of a given music piece, all keys to be depressed at one time so as to have the player use his own judgement to select each key to be depressed.

Music pieces are composed in a variety of different manners, among which there may be such music pieces where only a few keys are to be depressed in one phrase, yet these keys vary over a wide pitch range from relatively high pitch to relatively low pitch. If the disclosed technique in the Japanese patent publication is used to provide indication of keys to be depressed for such a music piece, the indicated keys in the phrase tend to be so sparse that the player (i.e., one doing performance practice) can not readily or intuitively recognize from the indication which key range is to be depressed. This would cause a significant problem that the player is embarrassed about how to position his hands in order to depress keys.

SUMMARY OF THE INVENTION

It is therefore an object of the present invention to provide an electronic musical instrument which is capable of indicating performance operators to be operated in such a manner that a player can readily recognize such operators to be depressed.

In order to accomplish the above-mentioned object, the present invention provides an electronic musical instrument which comprises plural performance operators to be used by a player to perform desired note, an indication section provided in corresponding relations to the performance operators, for indicating a desired note, a note range information supplying section for, with respect to a given music piece, supplying information representing at least highest-pitch and lowest-pitch notes of performance notes contained in each of plural phrases of the given music piece, and a control section for, during performance of the music piece and on the basis of the information sequentially supplied by the note range information supplying section, controlling the indication section to indicate all the notes within a range from the highest-pitch note to the lowest-pitch note for each phrase.

With the electronic musical instrument as thus arranged, because all the notes within a range from the highest-pitch note to lowest-pitch note are indicated, the player can instantly recognize a range to be operated, by his analog sense or intuitively. Consequently, the player can easily position his hands over accurate performance operators, i.e., keyboard keys and thereby can very comfortably deal with performance operations for each phrase.

In a preferred mode of embodiment, at least one of the current and next notes corresponding to the current and next performance timing may be indicated in a different manner from other notes. For example, all the notes within a range from the highest-pitch note to the lowest-pitch note in any of the phrases may be indicated by a predetermined color (green in the later-described embodiments), and indication of at least one of the current and next ones of the notes corresponding to the current and next performance timing may be changed to another color (red in the later-described embodiments). By thus indicating the current note in a special manner, it is quite visibly informed to the player which specific note should be performed now with respect to the note range of the phrase roughly indicated in a predetermined manner (for example, in green color). Further, by similarly indicating the next note in a special manner, it is also visibly informed to the player which specific note should be next performed with respect to the note range of the phrase roughly indicated in a predetermined manner (for example, in green color). Such special indication will substantially ease the performance operations of the player. Particularly, the latter case advantageously provides an effective operating guide when the player performs an unfamiliar music piece.

More preferably, the current and next notes may be indicated in a different manner from each other. For example, by indicating the current note in one special manner (for example, by lighting it in red) and indicating the next note in another special manner (for example, by flashing it in red), it is simultaneously informed visibly to the player which notes should be performed now and next with respect to the note range from the highest-pitch note to the lowest-pitch note in the phrase that are roughly indicated in a predetermined manner (for example, in green). This will enhance the advantage of the operating Guide effect and make the player's performance operations even easier.

In another preferred mode, there may be provided a confirmation section which, for each of the phrases, confirms whether notes corresponding to the note information sequentially supplied, during performance of the music piece, by the performance information supplying section have actually been performed via the performance operators. In this case, once the confirmation section has confirmed that all the notes of the phrase have been performed, the control section may control the indication section to indicate all notes within a range from the highest-pitch note to the lowest-pitch note of the next phrase. Because this causes the indication by the indication section to change in accordance with the progress of the player's performance operations, the performance operations can be easier than when the indication automatically changes at a constant tempo or rate, and this arrangement will very suitably be used for beginner's performance practice.

In order to accomplish the above-mentioned object, an electronic musical instrument in accordance with another aspect of the present invention comprises plural performance operators to be used by a player to perform desired note, an indication section provided in corresponding relations to the performance operators, or indicating desired note, a performance information supplying section for, with respect to a given music piece, sequentially supplying performance information including at least note information for performing the music piece, and a control section for, on the basis of the performance information sequentially supplied by the performance information supplying section, controlling the indication section to indicate a first note corresponding to predetermined performance timing, and further controlling the indication section to indicate one or more notes to be performed within a given time period in different manners depending on time differences between the respective performance timing of the one or more notes and the predetermined performance timing of the first note.

With the electronic musical instrument thus arranged, because the first note corresponding to predetermined performance timing is indicated and one or more notes to be performed within a given time period after the first note are also indicated in different manners depending on time differences between the respective performance timing of the one or more notes and the predetermined performance timing of the first note, the player can intuitively recognize performance timing differences, from the first note performance timing, of the succeeding individual notes. Thus, the player can know in what sequence he should work the individual performance operators and hence can very comfortably deal with the performance operations.

In order to accomplish the above-mentioned object, an electronic musical instrument in accordance with still another aspect of the present invention comprises plural performance operators to be used by a player to perform desired note, an indication section provided in corresponding relations to the performance operators, for indicating desired note, a performance information supplying section for, with respect to a given music piece, sequentially supplying performance information including at least note information for performing the music piece and phrase information specifying plural phrases of the music piece, and a control section for, during performance of the music piece and on the basis of the performance information sequentially supplied by the performance information supplying section, controlling the indication section to relatively quickly indicate, in advance of performance of each phrase, one or more notes to be performed in the phrase in accordance with order of performance of the notes.

With the electronic musical instrument thus arranged, because, in advance of performance of each phrase, one or more notes to be performed in the phrase are sequentially indicated relatively quickly in accordance with the order of performance of the notes, the player can know for each phrase in what sequence he should work the individual performance operators and hence can very comfortably deal with the performance operations. Preferably, on the basis of information representing performance timing of individual notes to be sequentially performed, such notes may be indicated at a relatively high speed by compressing intervals between the respective performance timing of the notes. By so doing, the player can intuitively recognize, for each phrase, which performance operators should be worked at which relative performance intervals. This will provide a further useful assistance to the player's performance operations.

In a preferred mode of embodiment of the thus-arranged electronic musical instrument, similarly to the above-mentioned, at least one of the current and next notes corresponding to the current and next performance timing may be indicated in a different manner from other notes. Further, both of the current and next notes may be indicated in manners different from each other. In addition, similarly to the above-mentioned, the manner of indication may be changed in accordance with the progress of the player's performance operations.

In the embodiments to be described below with reference to the drawings, keyboard keys are employed as performance operators for performing desired note. Therefore, "key code" in the embodiments information represents the pitch of tone to be generated in response to depression of the key and should be understood as having the same meaning as the above-mentioned note information. The performance operators for performing a desired note may be any other suitable operators than the keyboard keys.

Now, the preferred embodiments of the present invention will be described in detail below with reference to the accompanying drawings.

BRIEF DESCRIPTION OF THE DRAWINGS

In the accompanying drawings:

FIG. 3A is a diagram showing by way of example performance data for one track that are stored in a performance information memory of FIG. 1;

FIG. 3B is a diagram showing the contents of various data contained in the performance data;

FIG. 4A is s diagram showing the contents of LED lighting data, LED flashing data and LED turning-off data used in the first and third embodiments;

FIG. 4B is a diagram showing the contents of LED lighting data, LED flashing data and LED turning-off data used in a second embodiments;

DETAILED DESCRIPTION OF THE PREFERRED EMBODIMENTS

An embodiment of the present invention to be described below is principally characterized in that, prior to performance of each phrase in a reproductive automatic performance, all LEDs associated with keys corresponding to a note range from the highest-pitch to lowest-pitch notes to be depressed in the phrase are lit in "green" to allow the player know a range of keys to be depressed for the phrase in question. The embodiment is also characterized in that each key to be next depressed is visibly indicated or displayed by flashing the corresponding LED in red, and upon reaching the predetermined depression timing of the key, the red LED is switched from the flashing state to the lighting state, so as to allow the player know the key to be depressed next and depression timing of the key.

Figure 1:
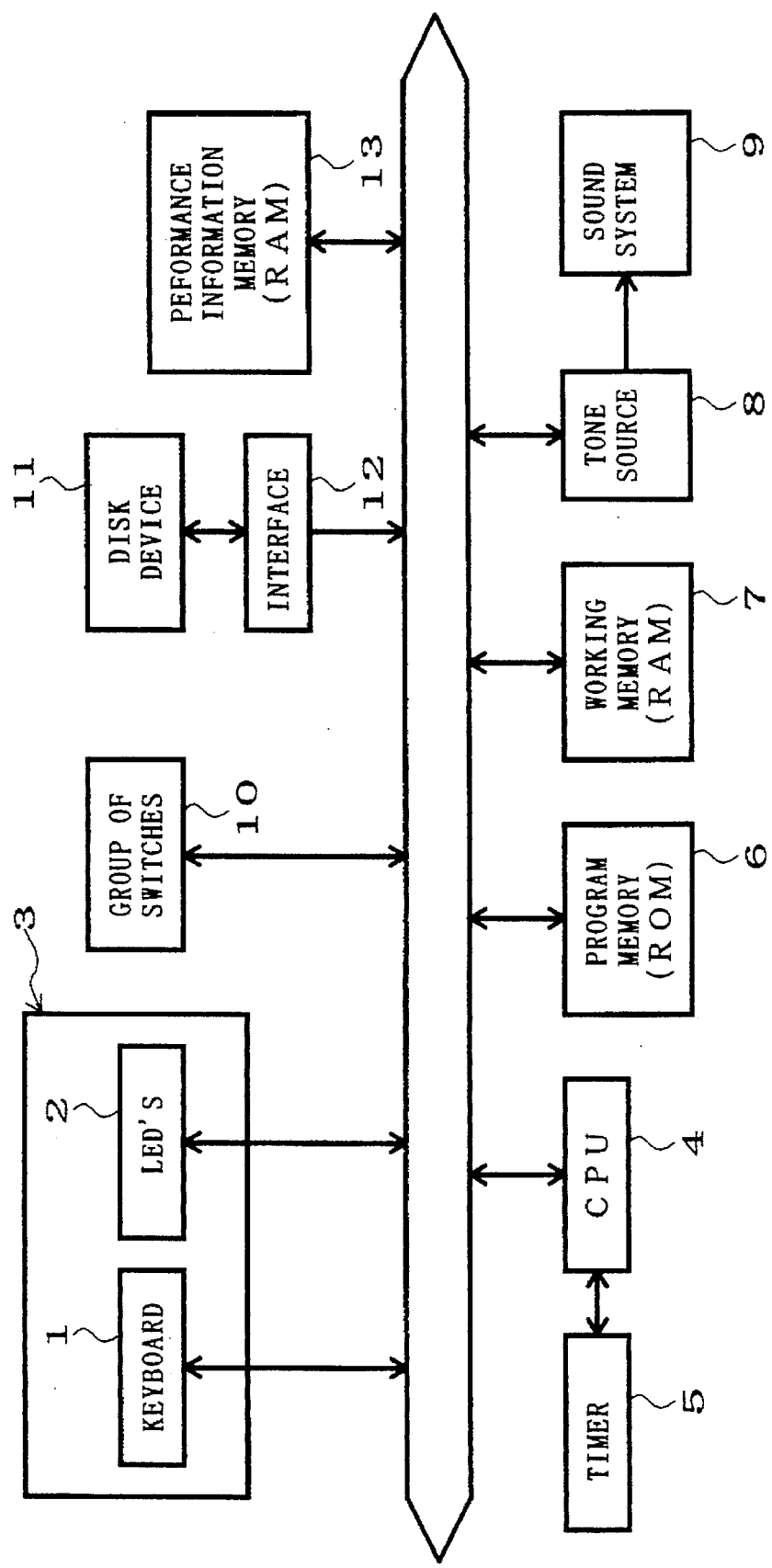
FIG. 1 is a block diagram illustrating the general structure of an electronic musical instrument in accordance with an embodiment of the present invention.

First, a description will be made on the overall hardware structure of the embodiment with reference to FIG. 1. In FIG. 1, a keyboard 1 is provided with plural LEDs 2a in corresponding relations to plural keys 1a. The depressed/released state of each key is detected by predetermined detection circuitry (not shown), and output detection signal from the detection circuitry is supplied to a CPU 4 via a data and address bus. Each of the LEDs 2a is of a type capable of emitting red and green lights, and the emitted light color and flashing/lighting indication of the LED 2a is controlled by the CPU 4 via the data and address bus.

A timer denoted by a reference character 5 supplies a timer interrupt signal to the CPU 4, which, in response to the interrupt signal, performs an interrupt process as will be described later in detail. The interrupt signal is generated from the timer at a variable rate depending on the tempo of a music piece to be performed; for example, in the case of 4/4 time, the interrupt signal is generated 24 times per beat. Reference character 6 denotes a program memory comprising a ROM, in which are prestored programs etc. for use in the CPU 4. Reference character 7 denotes a working memory provided in part of a RAM, in which are included a variety of registers, flags etc. to be later described. A note source 8 is capable of generating plural tone signals via plural channels on a time-divisional basis, under the control of the CPU 4. Tone signal generated from the note source 8 is converted into analog form via a D/A converter (not shown) and then audibly reproduced or sounded via a sound system 9 comprising amplifiers, speakers etc.

Reference character 10 denotes a group of switches, among which are switches for selecting, setting and controlling various states of the electronic musical instrument. More specifically, the switches include a mode change switch for variably setting a depressed key indication mode, a load switch for selecting and loading a desired piece of music, a start/stop switch for instructing a start/stop of automatic performance, etc. The operational state of each switch in the switch group 10 is determined by predetermined detection circuitry (not shown), and output signal from the detection circuitry is supplied to the CPU 4.

A disk device denoted by 11 is provided for writing and reading various performance data to and from a memory card, floppy disk etc. connected thereto from the outside. Reference character 13 denotes a performance information memory that is provided in a RAM for temporarily storing data exchanged between the disk device 11 and the CPU 4 via an interface 12 and the data and address bus.

Here, an explanation will be given on the contents of the performance information stored in the performance information memory 13. In the performance information for each music piece are set performance data for individual tracks that correspond to melody, accompaniment and other performance parts (such as drum, trumpet and bass). FIG. 3A shows the performance data for one track. As seen from FIG. 3A, in each of the tracks, there are set, in the order of progress of performance of the music piece, key data KD, phrase data PD and end data ED with duration data DD being set therebetween.

Each of these data will now be explained below with reference to FIG. 3B. Key data or key event data KD represents the contents of a tone to be generated and is comprised of a key-on code representing that the data is key data KD, a key code indicative of the pitch of the tone, a finger code indicating which of the player's fingers should be used to depress the key and gate time data indicative of a sounding duration time of the note. Duration data DD is indicative of a time interval and is comprised of a duration code indicating that the data is duration data DD and duration time indicative of the length of the time interval.

The term "event" as used herein means some new condition occurred. For example, the term "key event" indicates that some new operation has been made of a key; particularly the term "key-on event" indicates that a key has been depressed or operated and the term "key-off event" indicates that a key has been released from the depressed state. According to the present invention, as the gate time and duration time, a value of "24" is stored per time interval corresponding to one quarter note, i.e., one beat.

Further, the phrase data PD is data indicative of a musical pause to define a phrase of the music piece and is comprised of a phrase code to that effect. Alternatively, the phrase may be defined in terms of a predetermined musical unit such as a measure. The musical pause in this invention may be used so extensively as to mean a musical pause made by performance operation of relatively high degree of difficulty such as a so-called "finger crossing operation". Here, the "finger crossing operation" refers to such a finger operation where, for example, "F4" key is depressed with the right-hand thumb right after "E3" key has been depressed with the right-hand middle finger, or conversely "E3" key is depressed with the right-hand and middle finger right after "E4" key has been depressed with the right-hand thumb. As will be later described, by simultaneously displaying all notes from the highest-pitch note to the lowest-pitch note in relation to the phrase using such a finger crossing pause, the player will be able to readily predict how wide he must spread his fingers. The end data is indicative of the end of the performance data for this track and is comprised of an end code to that effect.

The performance data thus arranged for each track is stored with the track number TR to allow the data to be uniquely identified. This invention is designed in such a manner that the performance data to be depressed (sounded) with the player's right-hand is assigned to a track of track number 0 (TR0) while the performance data to be depressed with the player's left-hand is assigned to a track of track number 1 (TR1). Further, for convenience of description of the present invention, information on a music piece comprised of the performance data for plural tracks is called performance information; in other words, the performance information is a bundle of the performance data.

Next, "LED data" will be described. In a load routine to be later described, LED data are inserted in predetermined locations of the performance data. When the LED data is retrieved during a reproduction routine to be described later, a specific LED specified by the LED data is turned on or lighted, flashed or turned off as dictated by the data LED.

The detail of the LED data is shown by way of example in FIG. 4A. As shown in FIG. 4A, the embodiment uses three kinds of LED data: LED lighting data; LED flashing data; and LED turning-off data. The LED lighting data is comprised of an LED lighting code representing that this is the LED lighting data, a color code indicative of color to be emitted by the LED (green or red), and a key code uniquely specifying the LED to be lit. The LED flashing data is comprised of an LED flashing code representing that this is the LED flashing data, a color code indicative of color to be flashed by the LED (green or red, but, in this embodiment, the flashing color is only red ), and a key code uniquely specifying the LED to be flashed. Further, the LED turning-off data is comprised of an LED turning-off code representing that this is the turning-off data, a color code indicative of an LED color (green) to be turned off, and a key code uniquely specifying the LED to be turned off. The reason why the color code of the LED turning-off data does not include "red" is that each LED lit in red is turned off directly by a comparison/progress routine as will be described later.

Now, the operation of the embodiment arranged in the above-described manner will be described with reference to FIGS. 5 to 12. Here, the processing performed by the CPU 4 will be described routine by routine.

[Main Routine]

Figure 5:
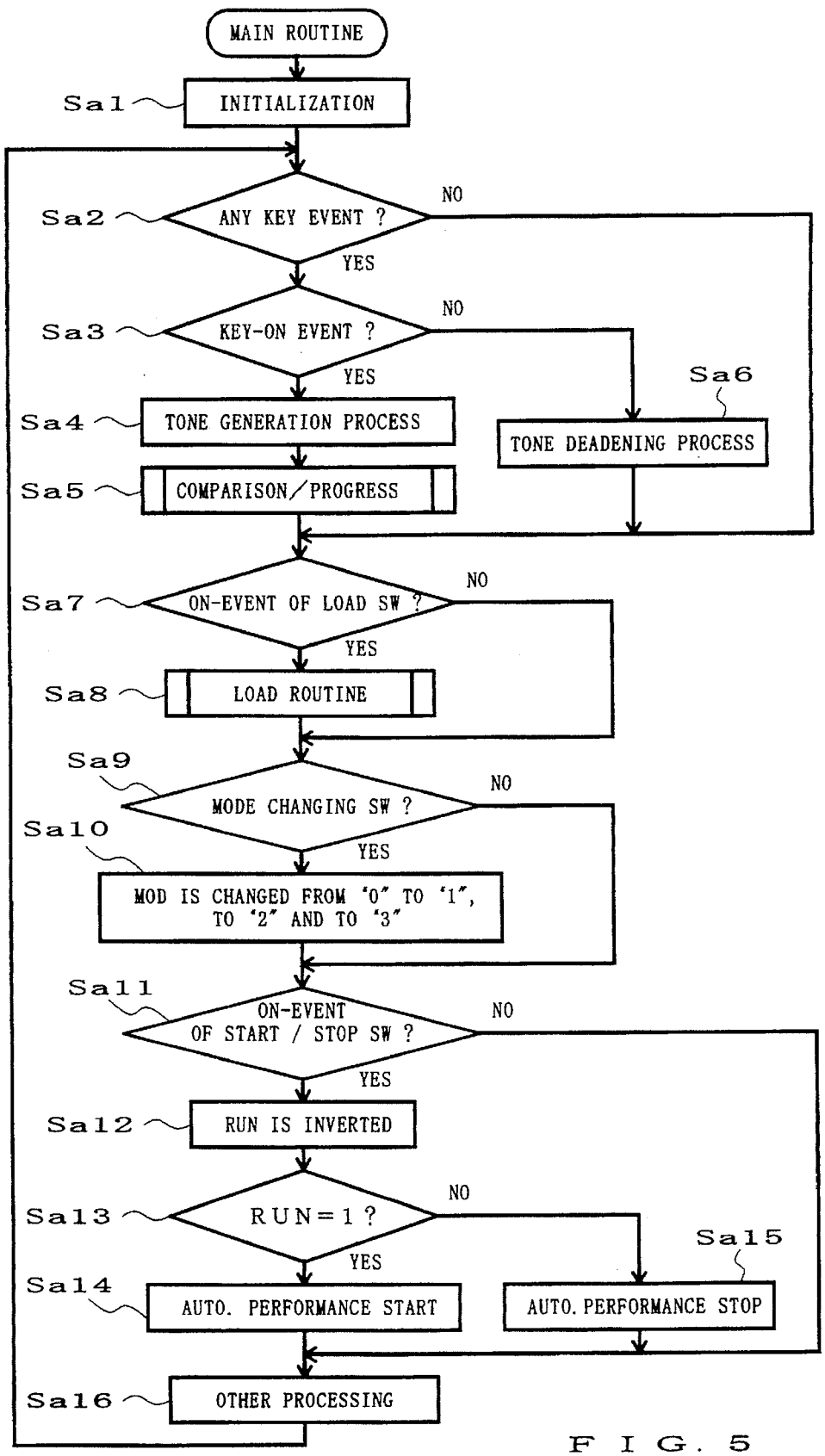
FIG. 5 is a flowchart illustrating an example of a main routine performed in each embodiment of FIG. 1.

Upon power-on of the electronic musical instrument, a main routine shown in FIG. 5 is triggered. First, in step Sa1, a predetermined initialization process is performed to reset various registers and flags provided within the RAM to respective initial values of "0" and the like.

Next steps Sa2 to Sa6 are intended for generating tone in response to the player's key depression operation. To this end, it is determined in step Sa2 whether there has been any key event, and if the determination result is in the affirmative (YES), a further determination is made in step Sa3 as to whether the key event is a key-on event. With an affirmative determination in step Sa3, a tone generation process is effected in step Sa4 to generate tone in accordance with the key depression, and a comparison/progress routine (to be described later) is effected in step Sa5.

If, on the other hand, the determination result of step Sa2 is in the negative (NO), the routine jumps to step Sa7 since no further operation is necessary when no key event has occurred. Further, with a negative determination in step Sa3, i.e., if a key-off event has occurred, a tone deadening process is effected in step Sa6 to deaden the tone having so far been generated in response to a key-on event.

Steps Sa7 and Sa8 are intended for providing preliminary operations for a depressed key indicating process which will be detailed later. Namely, in step Sa7, it is determined whether there has been an event of the load switch, i.e, whether the player has selected a desired music piece for performance and has given an instruction to load the performance information of the selected music piece into the electronic musical instrument. If the determination result is YES in step Sa7, the load routine is performed in step Sa8 as will be described later, but if NO, the routine immediately performs the operation of step Sa9.

Steps Sa9 and Sa10 are intended for setting a mode of the depressed key indicating process. There are four kinds of depressed key indicating (or guiding) mode: no-guiding mode; only-right-hand guiding mode; only-left-hand guiding mode; and both-hand guiding mode. Register MOD is provided for specifying the selected depressed key guiding mode by storing one of integral values "0" to "3" corresponding to the above-mentioned four guiding modes.

In step Sa9, a determination is made as to whether there has been an on-event of the mode changing switch. In answered in the affirmative in step Sa9, i.e., if the mode changing switch has been turned on, the value of the register MD is incremented by "one" to change the depressed key instructing mode. The value of the register MD is cyclically changed from "0" to "1", "1" to "2", "2" to "3", or "3" to "0" each time the mode changing switch is turned on. So, if the mode changing switch is turned on when the register MOD is at the value of "3", the value is returned to "0".

Thus, if, for example, the mode changing switch has been turned on when the depressed key guiding mode is the "no-guiding mode", it is changed to the "only-right-hand guiding mode". By then successively turning on the mode changing switch twice, the depressed key instructing mode is cyclically changed from the "only left-hand guiding mode" to the "both-hand guiding mode" and to the "no-guiding mode" each time the main routine is performed in a repetitive fashion.

Steps Sa11 to Sa15 are directed to performing an automatic performance in the embodiment. According to the embodiment, whether an automatic performance is in progress or not is detected from the value of flag RUN. More specifically, the value "1" of the flag RUN indicates that an automatic performance is in progress, while the value "0" of the flag RUN indicates that any automatic performance is not in progress.

It is detected in step Sa11 whether there is an on-event of the start/stop switch for instructing a start/stop of an automatic performance, i.e., whether the start/stop switch has been turned on. If the detection result is NO in step Sa11, the routine immediately jumps to step Sa16 since it is not necessary to perform any operation associated with the start/stop switch; if, on the other hand, the detection result is YES in step Sa11, the value of the flag RUN is inverted in step Sa12, and it is further determined in next step Sa13 whether the inverted value of the flag RUN is "1". If answered in the affirmative in step Sa13, this means that a start of an automatic performance is instructed when no automatic performance is in progress, and hence an automatic performance start routine is effected in step Sa14 as will be later described in detail.

In the event that the determination result is NO in step Sa13, this means that a stop of an automatic performance is instructed when an automatic performance is in progress, so that an automatic performance stop process is performed in step Sa15. In this stop process, key-off signal is given to all the tone generation channels currently generating tones, to thereby compulsorily stop generation of the tones.

Next, in step Sa16, other processing is performed as necessary for the electronic musical instrument to operate suitably, such as a process for changing tone color. Upon completion of the other processing, the main routine loops back to step Sa2 to repetitively perform the operations in this and succeeding steps until the power is shut off. As mentioned above, the main routine primarily comprises the process for generating tone in response to the key depression by the player, preliminary and setting operations for the subsequent depressed key instructing process, and the automatic performance start/stop process.

[Load Routine (Step Sa8)]

Figure 6:
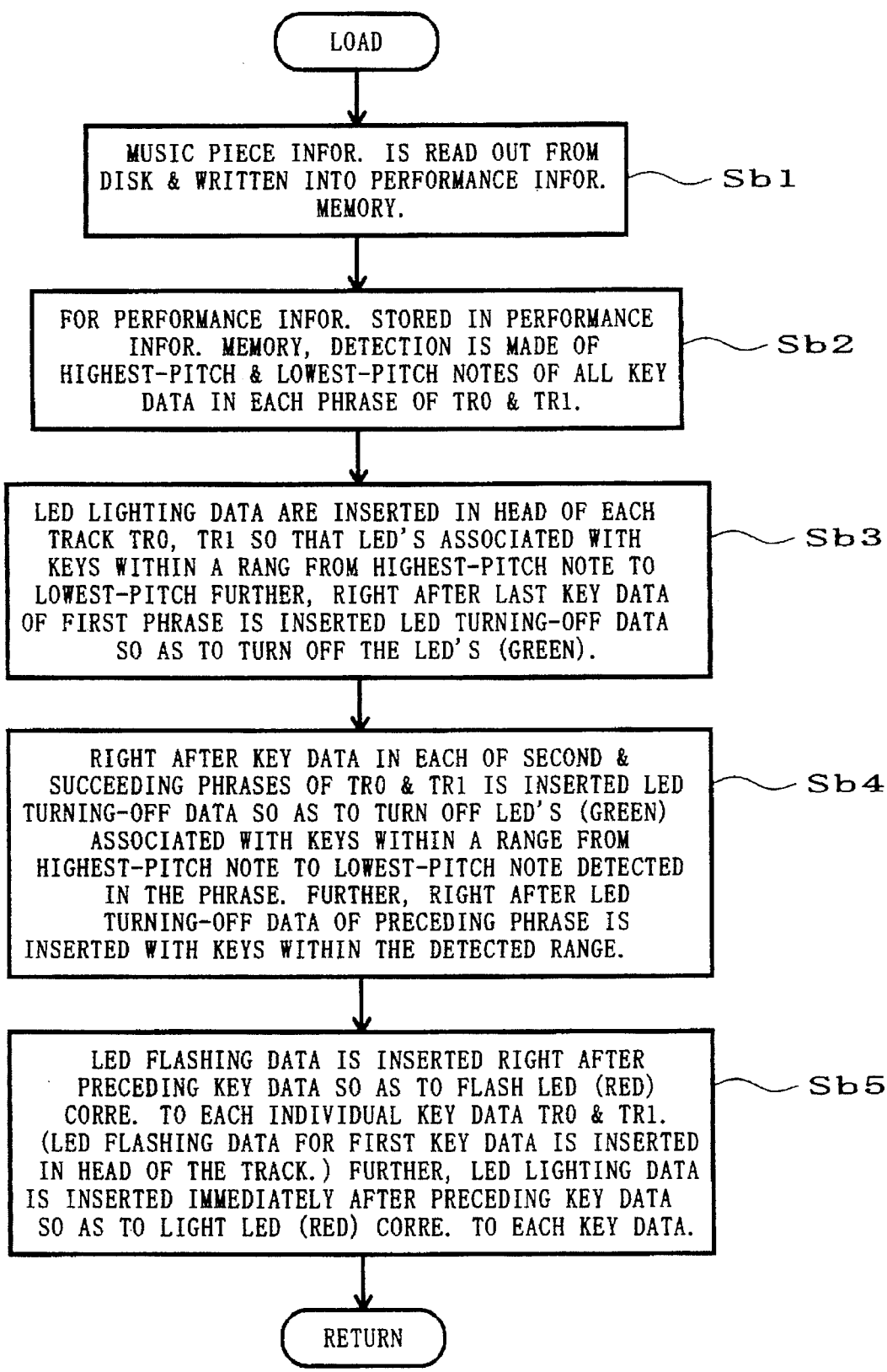
FIG. 6 is a flowchart illustrating an example (first embodiment) of s load routine of FIG. 5.

Upon arrival at step Sa8 of the main routine, the load routine of FIG. 6 is executed. In this load routine, predetermined LED data are inserted immediately before and after the key data, with respect to the performance data of tracks TR0 and TR1 contained in the loaded performance information for which key depression is to be made by the right and left hands.

First, in step Sb1, desired performance (music piece) information is read out from the disk device 11 and written into the performance information memory In next step Sb2, with respect to the performance data of tracks TR0 and TR1 contained in the performance information stored in the performance information memory 13, detection is made of the highest-pitch and lowest-pitch notes of all the key data KD in each phrase. That is, regarding each performance data of tracks TR0 and TR1, detection is made, for each phrase section defined by phrase data, of the key codes of the key data KD, corresponding to the highest-pitch and lowest-pitch notes in the phrase section.

Next, in step Sb3, an insertion process is performed with respect to a first phrase in the performance data of each track TR0 and TR1. That is, in the head of each of the tracks is inserted LED lighting data which instructs that the LEDs associated with the keys corresponding to the key codes within a range from the highest-pitch note to the lowest-pitch note detected in the first phrase of each of the performance data assigned to tracks TR0 and TR1 should be lit in green. Further, right after the last key data of the first phrase of each of the performance data assigned to tracks TR0 and TR1 is inserted LED turning-off data which instructs that the LEDs associated with the keys within a range from the highest-pitch note to the lowest-pitch note detected in the first phrase should be turned off.

Namely, in step Sb3, the LED lighting data inserted in track TR0 will have color code designating "green" and key codes designating all the notes within a range from the highest-pitch note to the lowest note detected in the first phrase, and the LED turning-off data inserted in the same track TR0 will have color code designating "green" and key codes designating all the notes within a range from the highest-pitch note to the lowest note detected in the first phrase. Similar operations are performed for track TR1.

Thereafter, in step Sb4, an insertion process is performed with respect to the second and succeeding phrases in the performance data assigned to tracks TR0 and TR1. That is, right after the last key data KD in each of the second and succeeding phrases in the performance data assigned to tracks TR0 and TR1 is inserted LED turning-off data which instructs that the LEDs associated with the keys within a range from the highest-pitch note to the lowest-pitch note detected in the phrase should be turned off. Further, right after the LED turning-off data of the phrase immediately preceding the phrase in question is inserted LED lighting data which instructs that the LEDs associated with the keys corresponding to the key codes within the detected range from the highest-pitch note to the lowest-pitch note detected in the phrase should be turned on.

Namely, in step Sb4, the LED turning-off data inserted in the track TR0 will have color code designating "green" and key codes corresponding to all the notes within a range from the highest-pitch note to the lowest note detected in the phrase, and the LED lighting data inserted in the same track TR0 will have color code instructing "green" and key codes corresponding to all the notes within a range from the highest-pitch note to the lowest note detected in the phrase. Similar operations are performed for track TR1.

Next, in step Sb5, processes are performed for inserting, in the performance data of the tracks TR0 and TR1, LED flashing data and LED lighting data corresponding to the individual key data. More specifically, in the first mentioned process, LED flashing data instructing that the LED associated with the key corresponding to each individual key data KD should be flashed in "red" is inserted, with each LED flashing data inserted right after the key data immediately preceding the key data in question. It should be appreciated here that LED flashing data for the first key data is inserted in the head of each track because there is no key data preceding the first key data. In the second mentioned process, so that, upon reaching at predetermined depression timing of the key corresponding to each individual key data KD, the LED associated with the key is lit in red, LED lighting data is inserted immediately after the immediately preceding key data.

Namely, each of the LED flashing data and LED lighting data inserted in the tracks TR0 and TR1 will have color code designating "red" and key code corresponding to the key data KD.

Thus, the LED data inserted in the tracks TR0 and TR1 in the load routine are arranged in such a manner that LED flashing data instructing that the key corresponding to the first key data KD should be flashed in red is placed in the head of each of the tracks TR0 and TR1 and LED lighting data instructing that the keys corresponding to all the notes within a range from the highest-pitch note to the lowest-pitch note in the first phrase should be continuously lit in green is placed after the LED flashing data.

Then, next to the "m"th (m is an integer not smaller than 1) key data KD is placed LED lighting data instructing that the key corresponding to the "m"th key data KD should be lit in red, and after the LED lighting data is placed LED flashing data instructing that the key corresponding to the "m+1"th key data KD should be flashed in red.

In particular, for the "m"th key data KD that is stored as the last key data in the "n"th (n is an integral value not smaller than 1) phrase, next to the LED flashing data instructing that the key corresponding to the "m+1"th key data KD should be flashed in red is placed LED turning-off data instructing that all the LEDs associated with the keys within a range from the highest-pitch note to the lowest-pitch note in the "n"th phrase should be turned off, and then LED lighting data instructing that the LEDs associated with the keys within a range from the highest-pitch note to the lowest-pitch note in the "n+1" phrase should be continuously lit in green.

The operations for lighting, flashing and turning off the LEDs on the basis of such LED data inserted in the above-mentioned manner are effected by the interrupt process as will be later described in detail.

[Automatic Performance Start Routine (Step Sa14)]

Figure 7:
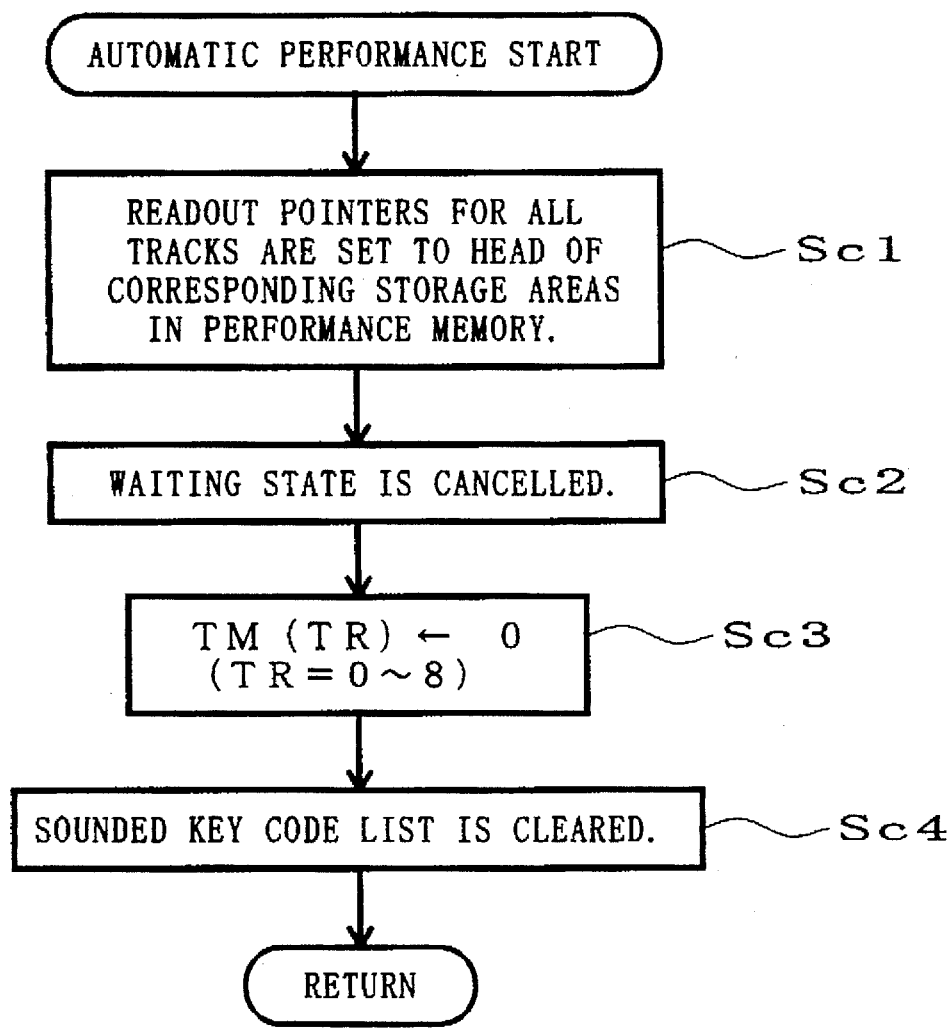
FIG. 7 is a flowchart illustrating an example of an automatic performance start routine of FIG. 5.
Figure 8:
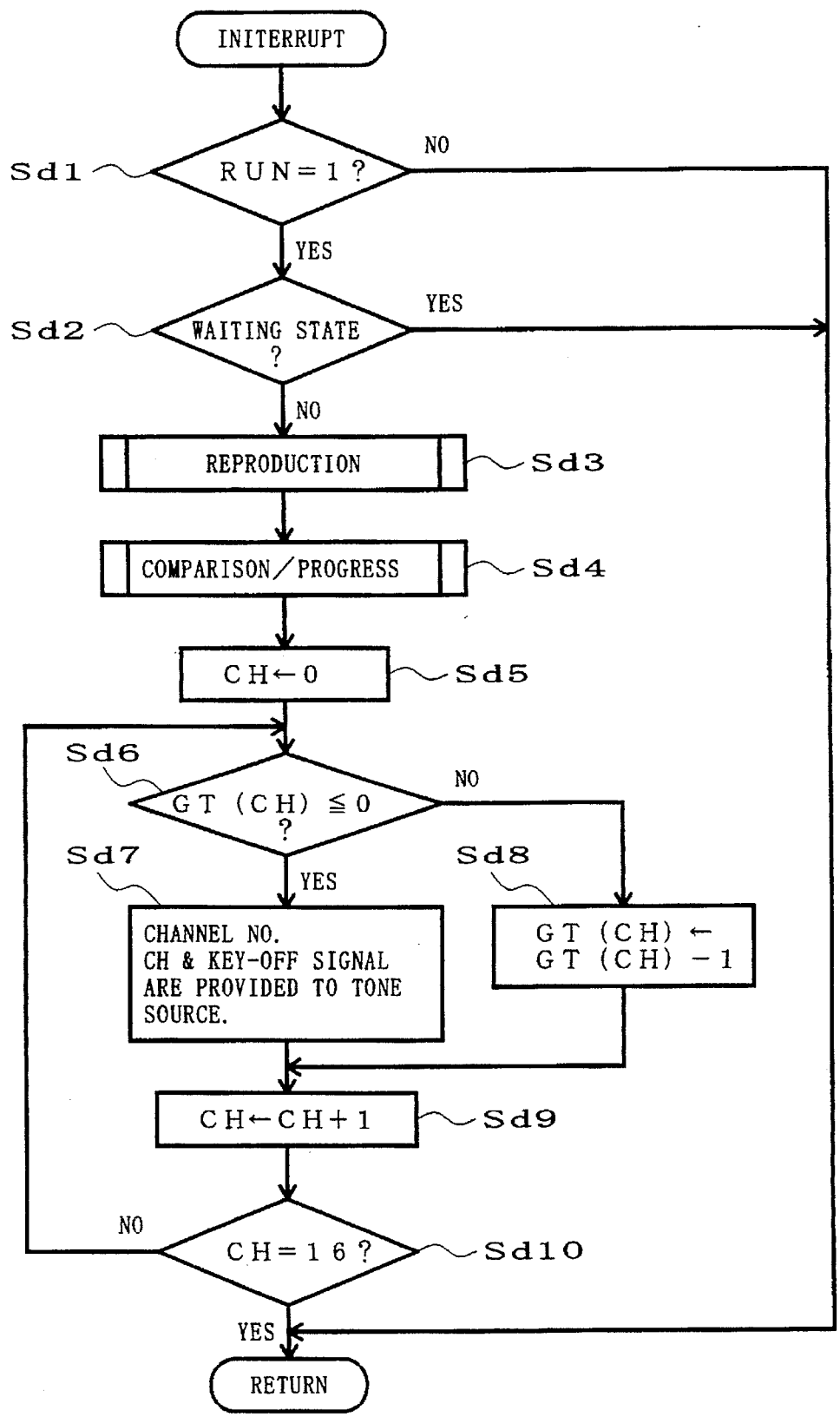
FIG. 8 is a flowchart of an interrupt process performed in each embodiment of FIG. 1.

Upon arrival at step Sa14 of the main routine, the automatic performance start routine is effected, as flowcharted in FIG. 7, to perform operations necessary for initiating an automatic performance. The automatic performance itself is carried out by the interrupt process as will be later described in detail.

First, in step Sc1, readout pointers for all the tracks of the performance information are set to the respective heads of the corresponding storage areas in the performance information memory 13. Next, in step Sc2, the waiting state is released. The term "waiting state" as used herein means such a condition where, after a depressed key instruction has been given, progress of an automatic performance is waited until a right key has been depressed. This waiting state is released at the start of an automatic performance.

Next, in step Sc3, registers TM(L) for storing the duration time for the individual tracks are set at "0". According to this invention, the duration time for each track is counted down each time the interrupt process is executed, and whenever the duration time count has reached "0", next key data KD is read out. For this purpose, the registers TM(L) are cleared to "0" prior to the start of an automatic performance. As seen from the track numbers "0" to "8" nine tracks can be handled simultaneously in this embodiment.

Thereafter, in step Sc4, a sounded key code list is cleared which is a listing of all the key codes to be sounded at each specific time point in the automatic performance. Accordingly, by detecting whether all the keys corresponding to the listed key codes have been depressed, it is possible to determine whether the player has depressed all the instructed keys (as will be later described more fully). This key code list is cleared prior to the start of the automatic performance.

As set forth above, the automatic start routine performs operations for setting or clearing various registers and listing in readiness for actual execution of an automatic performance.

[Interrupt Process]

Next, a description will be made on the interrupt process with reference to FIGS. 8 to 12. This interrupt process, which is performed separately from the repetitive execution of the main routine, is triggered by interrupt signal of the timer 3 at a frequency of 24 times per quarter note, and the frequency of this process is variable controlled in accordance with the reproduction tempo of a music piece performed.

First, in step Sd1, it is determined whether the flag RUN is at a value of "1". If answered in the negative, this means that no automatic performance is in progress, and hence this process immediately ends without performing any other operation. If, on the other hand, the determination result is "YES", it is further determined in step Sd2 whether the wait state is ON. If the device is in the waiting state as determined in step Sd2, this process immediately ends without performing any other operation since it is necessary to temporarily stop the progression of the automatic performance.

If, on the other hand, the determination result is "NO" in step Sd2, the reproduction routine (Step Sd3) is executed to perform operations depending on the duration time of the individual tracks as will be fully described later. After that, the comparison/progress routine is performed in step Sd4 which will also be described in detail later.

In step Sd5, in order to perform necessary operations with respect to channel "0", a value of "0" is set to register CH which is provided for storing the number of channel to be processed, i.e., any one of 16 channel numbers "0"–"15".

Then, in step Sd6, it is determined whether the value of register GT(CH), i.e., the gate time of the channel corresponding to the register CH is currently equal to or smaller than "0". If answered in the negative in step Sd6, the value of the register GT(CH) is decremented by one in step Sd8. If, on the other hand, the gate time is currently equal to or smaller than "0" as determined in step Sd6, this means that generation of a tone having so far been sounded is to be terminated, and hence the value of the register CH and key-off signal are provided to the tone source 8. This terminates generation of the tone signal in the tone generation channel so that the tone having so far been sounded in the channel is muted or deadened.

Then, in step Sd9, the value of the register CH is incremented so as to perform the above-mentioned operations for the next tone generation channel. Next, in step Sd10, a determination is made as to whether the value of the register CH is "16". With a negative determination in step Sd10, the routine loops back to reenter Sd6 so that the operations of steps Sd6 to Sd9 are performed for each of the other channels "1" to "15". Upon completion of such operations, the determination in step Sd10 becomes "YES", and this routine comes to an end.

[Reproduction Routine]

Figure 9:
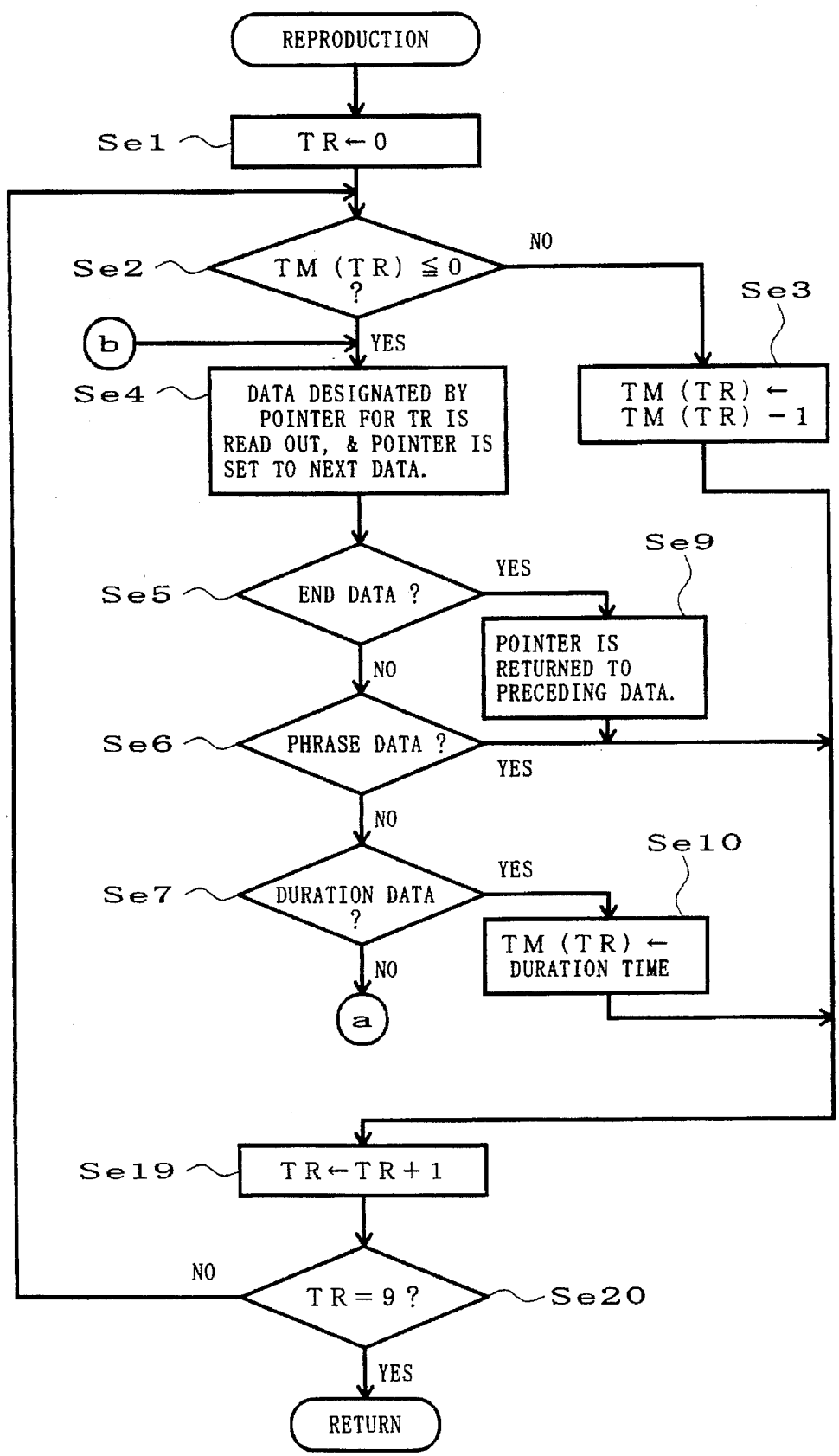
FIG. 9 is a flowchart illustrating a part of an example of a reproduction routine shown in FIG. 8.
Figure 10:
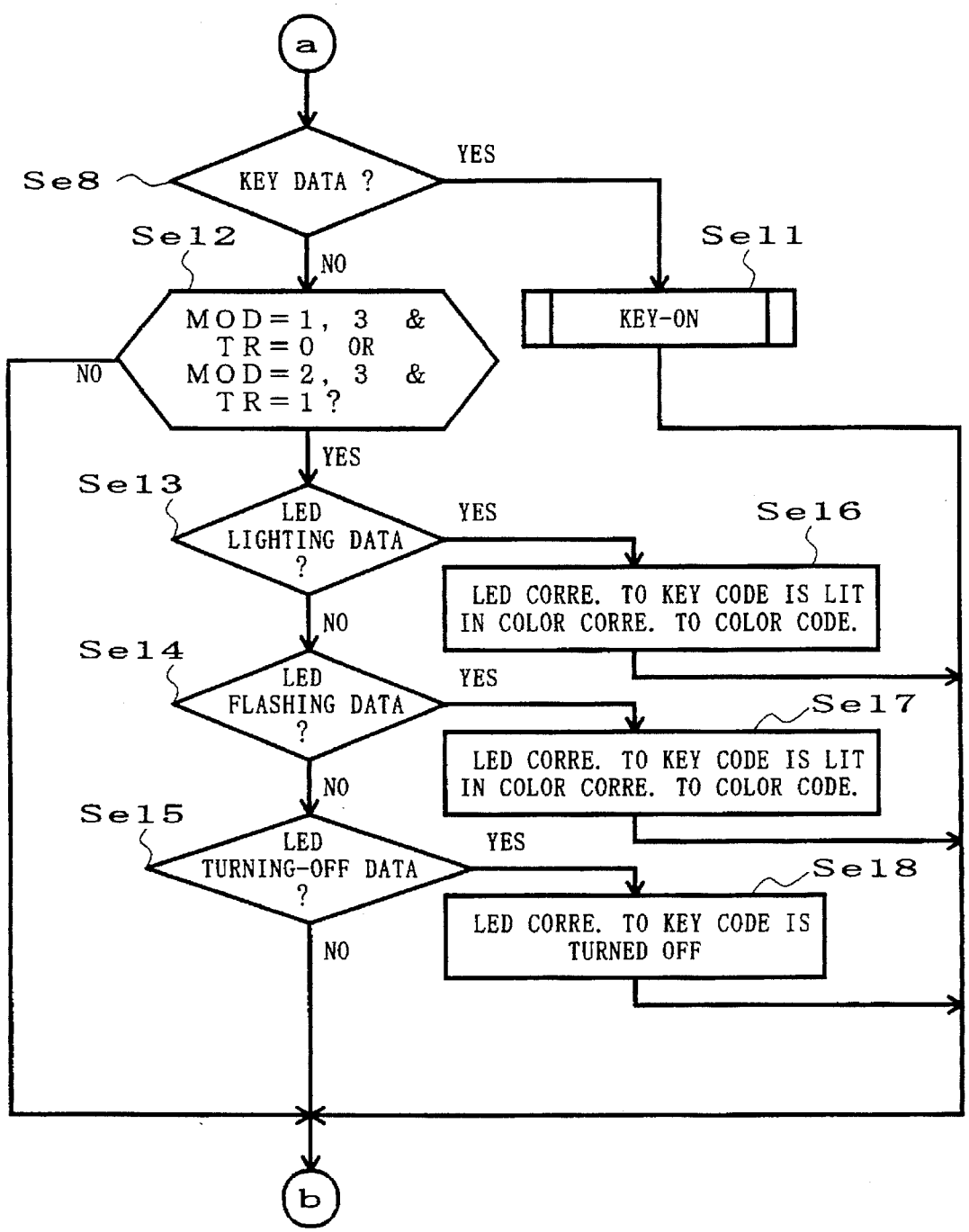
FIG. 10 is a flowchart illustrating the remaining part of the reproduction routine.

Upon arrival at step Sd3 of the interrupt process, the reproduction routine is executed as flowcharted in FIGS. 9 and 10. This reproduction routine is intended for processing the performance data on the basis of the value of the register TM(TR) set when the interrupt process has been triggered. This performance data include data on the depressed key indication by the LED lighting, LED flashing or LED turning-off data and on tone generation process to be performed when no depressed key indication via LEDs is made. As will be mentioned later, the value of the register TM(TR) indicates the duration time for the corresponding track TR and varies each time the interrupt process is triggered, so that it will eventually coincide with the progress of the automatic performance.

First, in step Se1 of FIG. 9, "0" is set to the register TR in order to perform the same operations for each track. Next, in step Se2, a determination is made as to whether the value stored in the register TM(TR) is equal to or smaller than "0". If the duration time is not equal to or smaller than "0" it is not necessary to perform any operation, and hence the routine goes to step Se19 after incrementing the register TM(TR) by one.

If, on the other hand, the duration time has become equal to or smaller than "0" as determined in step Se2, it indicates that next data should be read out. Thus, in step Se3, the data designated by the pointer of the track corresponding to the value of the register TR is read out, and the pointer is set so as to point to the next data position. After that, in steps Se5 to Se8 (for step Se8, refer to FIG. 10), it is determined whether the data read out in step Se4 is end data, phrase data, duration data or key data, respectively.

If the read-out data is end data as determined in step Se5, the pointer for the track is returned to the data immediately preceding the end data, and then the operation of step Se19 is performed. If the read-out data is phrase data as determined in step Se6, the operation of step Se19 is performed. If the read-out data is duration data as determined in step Se7, the duration time designated by the duration data is set to the register TM(TR) in step Se10, and then the operation of step Se19 is performed.

Further, if the read-out data is determined as key data in step Se8, a key-on process is executed in step Se11 as will be described later. If, however, the readout data is not key data as determined in step Se8, the routine advances to step Se12 to further determine the currently-set depressed key guiding mode and the track being currently used for the processing and also check to see whether the read-out data has anything to do with the depressed key indication process. Namely, if step Se8 has determined that the read-out data is not key data, it is further determined in step Se12 whether the current case corresponds to one of two cases: (1) where the value of the register MOD is "1" or "3" and the value of the register TR is "0"; and (2) where the value of the register MOD is "2" or "3" and the value of the register TR is "1". The first-mentioned case (1) is where at least the right-hand guiding is selected and the track to be processed is TR0 indicating the performance data to be key-depressed and sounded with the right-hand, and the second-mentioned case (2) is where at least the left-hand guiding is selected and the track to be processed is TR1 indicating the performance data to be key-depressed and sounded with the left-hand.

Therefore, if the determination result is NO in step Se12, this means that the read-out data has nothing to do with the depressed key indication process, and hence the routine reverts to step Se4 of FIG. 9 so as to read out the next data. If the determination result is YES in step Se12, it is determined in steps Se13 to Se15 whether the data read out in the previous step Se4 is any of LED lighting data, LED flashing data and LED turning-off data.

If step Se13 has determined that the read-out data is LED lighting data, the LED corresponding to the key code contained in the LED lighting data is turned on or lit in the color designated by the color data of the LED lighting data (step se16). According to this embodiment, if the LED lighting data was inserted in step Sb3 or Sb4 of the load routine (see FIG. 6), the LEDs associated with all the keys within a range from the highest-pitch to lowest-pitch notes to be depressed are lit in green. If, on the other hand, the LED lighting data was inserted in step Sb5 of the load routine (see FIG. 6), this means that the current automatic performance has reached such timing when the key corresponding to the key code contained in the LED lighting data, and hence in order to indicate that the key depression is to be made just now, the LED corresponding to the key code is lit in red.

If the read-out data is LED flashing data as determined in step Se14, the LED corresponding to the key code contained in the LED flashing data is flashed in the color corresponding to the color data contained in the LED flashing data (step Se17). In this embodiment, the current automatic performance has reached such timing when the key immediately preceding the key corresponding to the key code contained in the LED lighting data, and hence it order to indicate the key to be depressed next, the LED corresponding to the key code in the LED flashing data is flashed in red.

Or, if step Se15 has determined that the read-out data is LED turning-off data, the LED corresponding to the key code contained in the LED turning-off data is turned off (step Se18).

If the determination result of step Se12 is NO, the determination result of step Se15 is NO, when the key-on routine of step Se11 has been completed, or when the operations of steps se16 to Se18 have been completed, the routine reverts to step Se4 to read out the next data and perform operations on the basis of the read out data.

Upon completion of the operations based on the data read out in step Se4, the routine goes to step Se19, where, in order to perform operations similar to the above-mentioned, the value of the register TR is incremented by one. Then, in step Se20, a determination is made as to whether the incremented value of the register TR is "9". With a negative determination in step se20, the routine loops back to step Se2 so as to perform the operations of step Se2 to Se18 for each of the other tracks "1" to "8". Then, upon completion of the operations for every track, the determination in step Sd10 becomes "YES" and this routine comes to an end.

[Key-on Routine]

Figure 11:
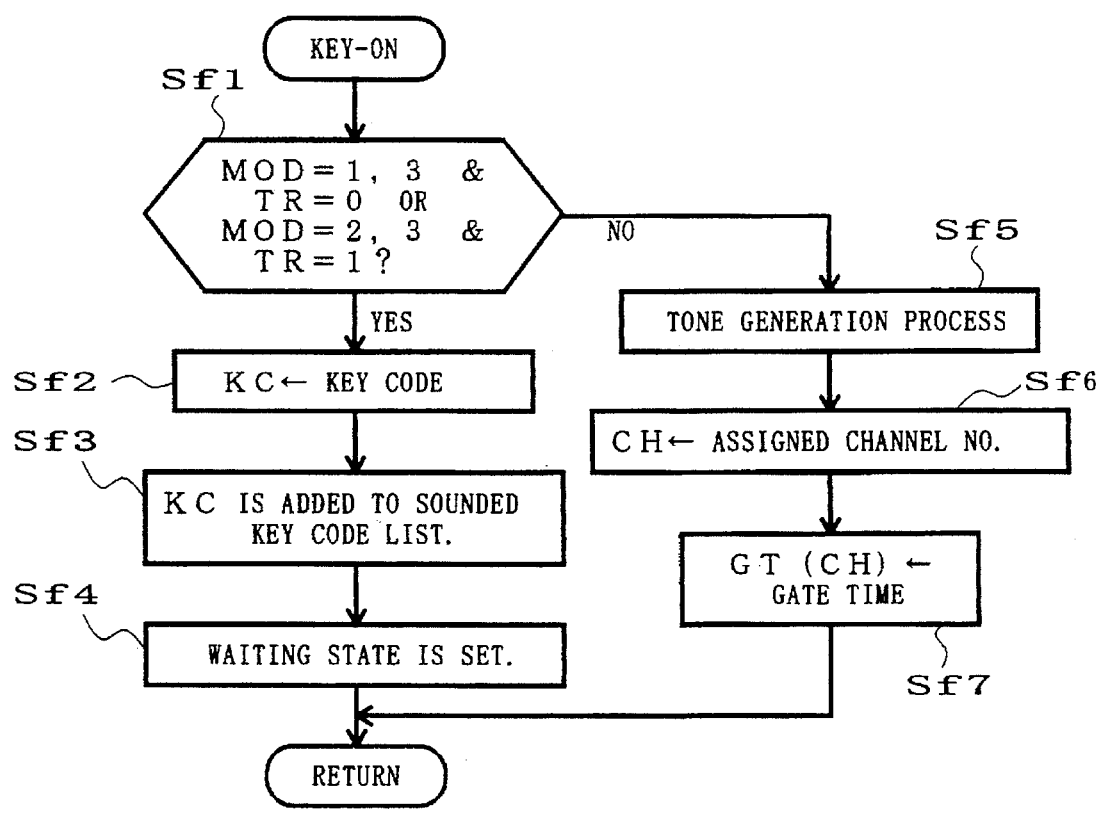
FIG. 11 is a flowchart illustrating an example of a key-on routine of FIG. 10.

Upon arrival at step Sell of the reproduction routine, the key-on routine is executed as flowcharted in FIG. 11. This routine generates a tone based on the key data read out in step Se4 in the case where the data has nothing to do with the depressed key indication process, but executes operations for temporarily stopping the progression of automatic performance until the player has depressed a key as dictated by the depressed key indication via LEDs in the case where the data has anything to do with the depressed key indication vis LEDs.

First, in step Sf11, it is determined, similarly to the above-mentioned step Se12, whether the current case is one of two cases: (1) where the value of the register MOD is "1" or "3" and the value of the register TR is "0", and (2) where the value of the register MOD is "2" or "3" and the value of the register TR is "1". If the determination result is YES in step Se12, the key code contained in the key data read out in step Se4 is stored in the register KC (step Sf2) and is added to the sounded key code list (step Sf3), and the waiting state is set ON (step Sf4). In the waiting state, the interrupt process is not actually executed even if it is triggered, and hence the automatic performance is caused to stop progressing.

If, on the other hand, the determination result is NO in step Sf1, a tone generation process is performed on the basis of the key data read out in step Se4 (step Sf5), a channel number assigned during the tone generation process is set to the register CH (step Sf6), and the gate time contained in the key data is set to the register GT(CH) which counts down the gate time for the track being currently processed (step Sf7). Then, after the operation of step Sf4 or 7, this key-on routine comes to an end.

[Comparison/Progress Routine]

Figure 12:
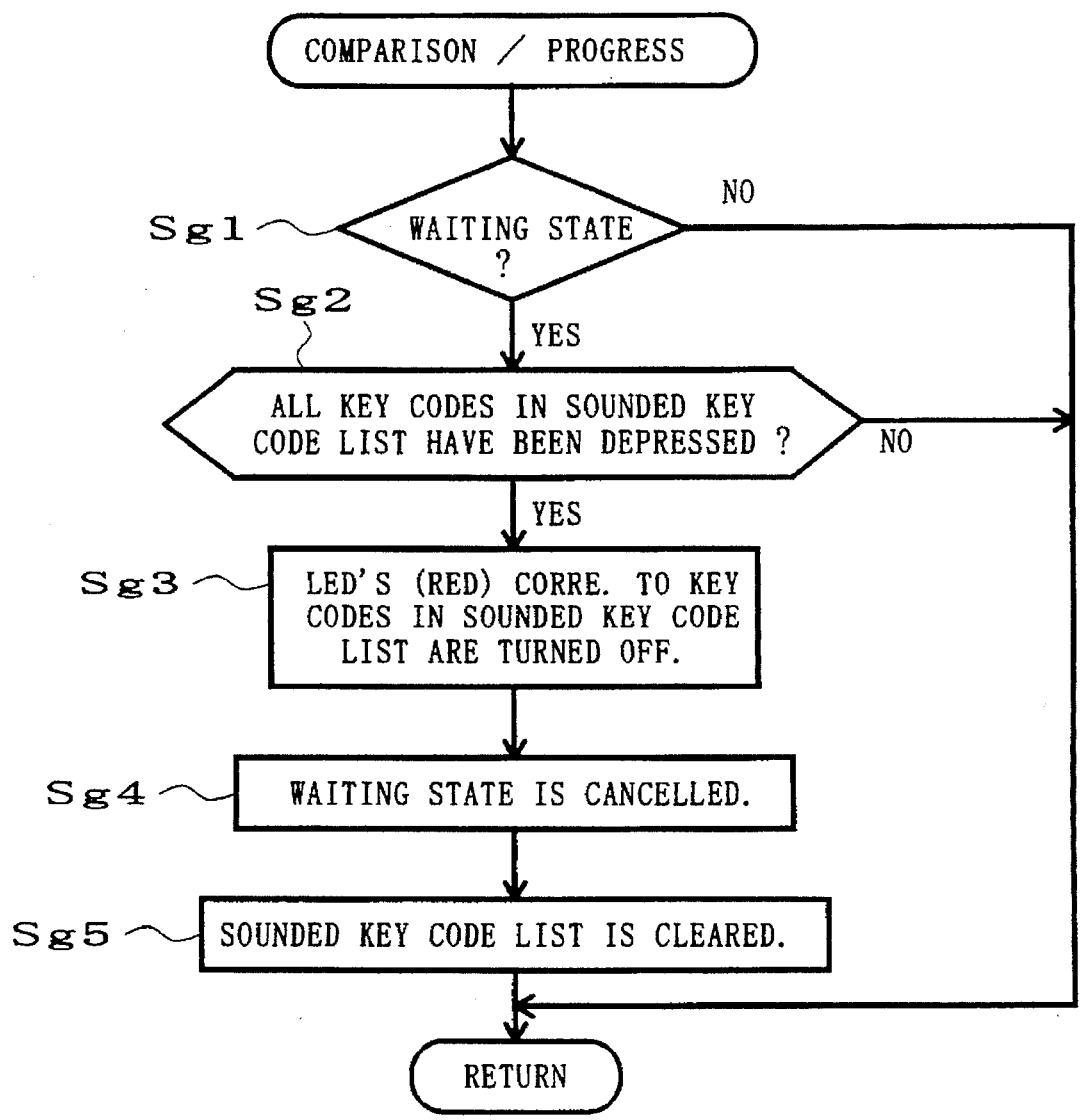
FIG. 12 is a flowchart illustrating an example 0f a comparison/progress routine of FIG. 5.

Upon arrival at step Sa5 of the main routine (FIG. 5), or arrival at step Sd4 of the interrupt process, the comparison/progress routine is effected as flowcharted in FIG. 12. In this comparison/progress routine, it is checked whether all the keys have been actually depressed by the player as designated by the depressed key indication via the LEDs. If so, operations are performed for cancelling the temporary stop state of the automatic performance.

First, in step Sg1, it is determined whether the waiting state is currently set ON. If answered in the negative, it is not necessary to perform any other operation of this routine, and hence the routine immediately ends; if, on the other hand, the waiting state is set ON (YES), then, it is further checked in step Sg2 whether all the keys contained in the sounded key code list have been depressed.

If the determination result is YES in step Sg2 meaning that all the keys in the sounded key code list have been actually depressed by the player, the LEDs corresponding to the key codes in the sounded key code list (being lit in red) are turned off (step Sg3), the waiting state is cancelled (step Sg4), and the sounded key code list is cleared (step Sg5).

[Detailed Operation of the Embodiment]

Next, a description is given on the detailed operation of the embodiment. At predetermined time (time necessary for the initialization of step Sa1) after the power-on of the electronic musical instrument, the repetitive execution of steps Sa2 to Sa16 of the main routine is initiated. Then, in response to the player's depression of any of the keys on the keyboard 3 (FIG. 1), the tone generation process is performed in step Sa4. Once the player releases any depressed key, the tone deadening process is performed in step Sa6. In this manner, tones are generated in accordance with the player's key depression operations.

Once the player activates the load switch in the switch group 10, the load routine is performed in step Sa8 so that LED data are inserted immediately before and after the key data in the performance data to be key-depressed with the right and left hands.

The setting of a depressed key instructing mode is also performed in steps Sa8 and Sa9 of the main routine.

If the player activates the start/stop switch included in the switch group in order to instruct a start of an automatic performance, execution of the interrupt process is permitted (RUN=1), and then the automatic performance routine is executed in step Sa14. If, on the other hand, the player activates the start/stop switch in order to instruct a stop of an automatic performance, execution of the interrupt process is inhibited (RUN=0), and then the automatic performance stop process is executed in step Sa15.

(1) Progression of an Automatic Performance

Upon permission of the interrupt process, the interrupt process is executed, separately from the repetitive execution of the main routine, at a frequency (24 times per quarter note) depending on the tempo of the automatic performance. In the interrupt process, the duration time for each track is examined, and if the duration time is "0", some data is read in step Se4 and operations are performed depending on the read-out data. If, on the other hand, the duration time is not "0", the duration time (register TM(TR)) is decremented by "1" in order to advance the automatic performance to the next timing (step Se3).

At this time, if the read-out data is key data, the tone generation process is executed on the basis of the key code contained in the key data (step Sf5), and the gate time of the key data is set. Then, some other data read out in Se4, and if this read-out data is duration data, the duration time designated by the duration data is stored into the register TM(TR) in step Se10. Such operations are performed for each track (step Se2 to Se20).

Once the gate time set in the register GT(CH) has reached "0", generation of the tone is stopped (step Sd7). When the gate time is not "0" yet, it is decremented by one each time the interrupt process is triggered (Sd8). Namely, generation of the tone based on the key data is terminated once the interrupt process has been triggered a predetermined number of times corresponding to the gate time value of the key data. Such operations are performed for each track (step Sd6 to Sd10).

Thus, according to the embodiment, the automatic performance process is performed for each track and thereby the automatic performance progresses. Along with the progress of the automatic performance, the duration and gate times are counted down. In the case where the depressed key indication is set, the automatic performance is stopped until all the keys designated by the depressed key instruction have been depressed by the player, so that it is allowed to progress in accordance with the player's performance operations.

(2) Depressed key Indication Via LEDs:

Next, a description will be made on the operation of the embodiment in the case where the depressed key indication has been set. First, the green light emission of LEDs are described.

(2)—1 Turning-on of LED Green Light Indication:

The moment the automatic performance has reached tone generation timing of the last key data of a given phrase defined by phrase data, the LEDs having so far been lit in green are turned off, and in stead the LEDs associated with all the keys within a range from the highest-pitch to lowest-pitch notes to be depressed in the next phrase are lit in green. But, in the case of the first phrase, such LEDs are lit immediately at the start of an performance.

This is because the LED lighting data is inserted immediately before and after key data in the load routine and read out in the reproduction routine, and because the insertion of the LED lighting data immediately before and after key data is not affected by the duration time.

(2)—2 Flashing and Continuous Lighting in Red of LED:

The moment the automatic performance has reached timing to depress (sound) certain key data, the LED associated with the key to be next depressed starts flashing in red. Then, once the automatic performance has reached timing of to the next key, the LED is changed from the flashing state to the continuously lighting state. Similarly to the green light display, this is because the LED lighting data is inserted immediately before and after key data in the load routine and read out in the reproduction routine, and because the insertion of the LED lighting data immediately before and after key data is not affected by the duration time.

Figure 2A:
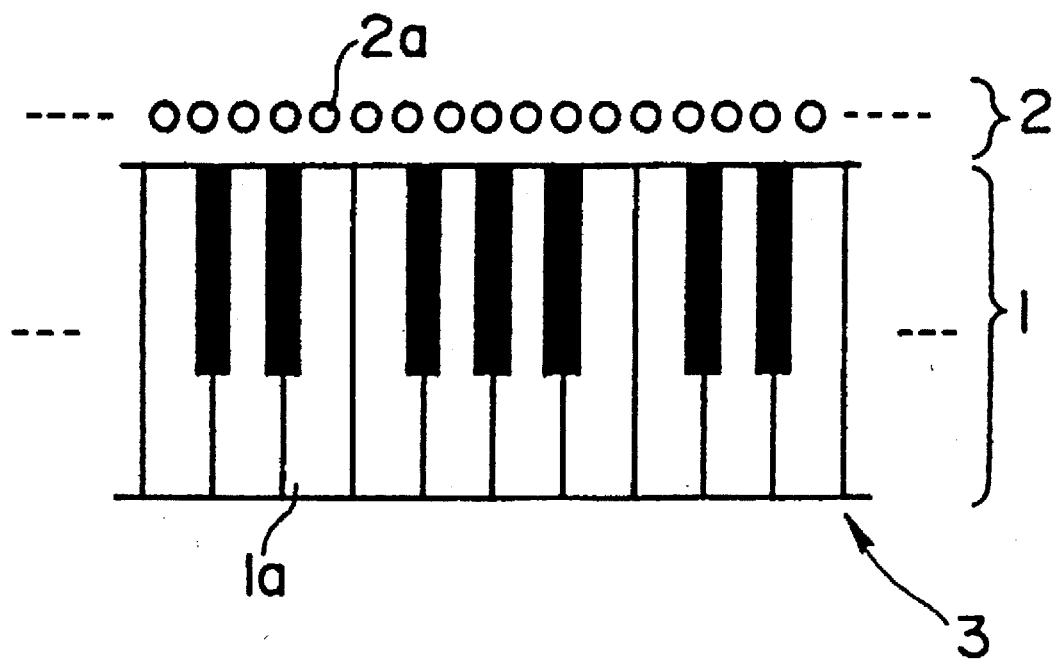
FIG. 2A is a plan view illustrating an example of arrangement in and around a keyboard employed in the embodiment of FIG. 1.
Figure 2B:
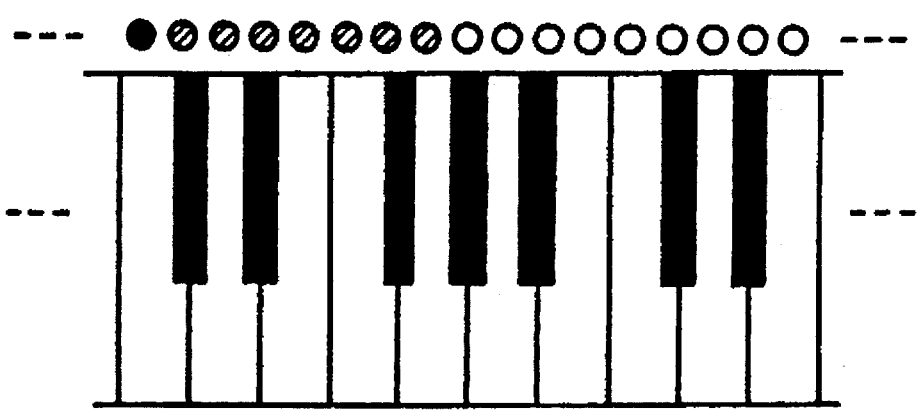
FIG. 2B is a plan view illustrating an example of depressed key indication in a first embodiment of the present invention.

Now, in FIG. 2B, there is shown a condition where a key to be depressed and its depression timing are displayed by the LED 2a. In this figure, the black circle denotes the lighting (flashing) display of LED in red and the hatched circles denote the lighting display of LED in green. It will be seen from this figure that the entire key range from the highest-pitch to lowest-pitch notes to be depressed in the next phrase covers is from "C" to "G" of a certain octave, and the key to be depressed next is note "C1". The difference between the flashing and continuously-lighting displays can not be distinguished from each other in the figure and therefore such illustration is omitted here.

According to the embodiment as has been described above, each key to be next depressed is indicated by a flashing LED display, and hence the player can previously know intuitively or sensuously how he should work or position his hands with respect to keys to be next depressed. In addition, the timing to depress the key is informed by the LED changing from the flashing state to the continuously-lighting state. Furthermore, because the key range to be operated in the next phrase is informed, the player can previously know sensuously how he should work or position his hands with respect to the key range to be operated.

When, although the keys to be depressed and their timing have been informed in the above-mentioned manner, the player fails to depress all the instructed keys, the waiting state set in step Sf4 is not cancelled in step Sg4. Consequently, the interrupt process is inhibited and temporarily stopped until the player has depressed all the keys designated by the depressed key indication via the LEDs. Once the player has depressed all the indicated keys, the waiting state is cancelled in the comparison/progress routine executed in step Sa5 or Sd4, so that the automatic performed starts progressing again. Thus, because the automatic performance can start progressing only when the player carries out the correct performance operations, the performance is allowed to suitably follow automatic performance of the other parts in accordance with the performance operations of the player.

A modified example of the above-described embodiment may be designed in such a manner that only key to be next depressed is indicated without currently-operated key being indicated at all. Further, the depressed key indication or display may be by sound rather than by visual means. Furthermore, information representative of the highest-pitch note and lowest-pitch note may be prestored in the performance data memory.

[Second Embodiment]

The above-mentioned first embodiment is generally characterized in that the moment the key depression timing of key data preceding specific key data in question has arrived, the specific key data is indicated by flashing the associated LED in red. In contrast, the second embodiment as will be fully described below is characterized in that the degree of lighting brightness of the LED to be lit in advance of the predetermined automatic performance timing of the corresponding key is varied in accordance with a time difference of the key's performance timing from the current performance timing. The lighting brightness may for example be set in such a manner that, on the assumption that the standard brightness of "100" is applied when the time difference corresponds to one beat (quarter note), no LED lighting display is made when the time difference corresponds to six or more beats, the brightness is "55" when the time difference corresponds to five beats, the brightness is "60" when the time difference corresponds to four beats, the brightness is "65" when the time difference corresponds to three beats, and the brightness is "70" when the time difference corresponds to two beats. That is, the degree of brightness is set in this embodiment to increase in arithmetic progression as the key depression timing approaches.

This second embodiment is similar in basic structure to the first embodiment, but different from the first embodiment in the following respects. First, it uses LED lighting data as shown in FIG. 4B. The term "brightness code" as used herein means data designating the degree of brightness of a LED in the continuously lighting state, and the degree of brightness can be adjusted by using the brightness code to control voltage that is supplied to the LED corresponding to a given key code. Second, the second embodiment replaces the load routine of FIG. 6 by a load routine of FIG. 13 and performs in step Se16 or Se17 of FIG. 10 such an operation for lighting or flashing the LED corresponding to a given key code in the color corresponding to the brightness code.

Figure 13:
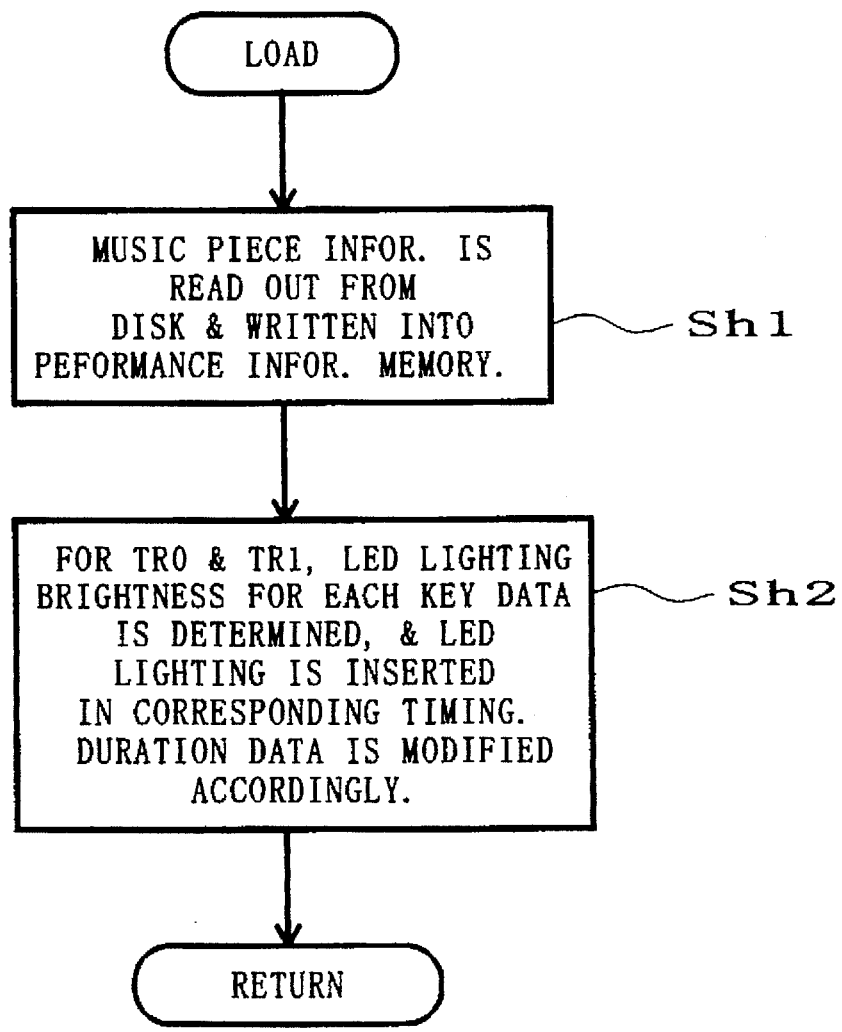
FIG. 13 is a flowchart illustrating another example (second embodiment) of the load routine of FIG. 5.

The load routine of FIG. 13 will be described below, which is triggered upon activation of the load switch. Step Sh1 will not be described here since it is the same as step Sb1. In step Sh2, for each key data in the performance data for track TR0, the LED lighting brightness is determined and corresponding LED lighting data is prepared. The thus-prepared LED lighting data is inserted in such a timing position that is a predetermined number (corresponding to the degree of brightness) of beats before the key data. In this case, the existing duration data is modified or prepared in correspondence to the inserted position of the LED lighting data. The modification of the duration data means that the duration time designated by the duration data is modified by the inserted position of the LED lighting data. The preparation of the duration data means that duration data is newly prepared, because the LED lighting data instructing an LED lighting is inserted at such timing where nothing to be done exists originally. The same operations are performed on the performance data for track TR1.

With this second embodiment, the degree of brightness increases stepwise as the key depression timing approaches. Because the LED lighting display is performed for every key to be depressed, all the keys to be depressed within a period of five beats from the current automatic performance timing are displayed by lighting the associated LEDs and their degrees of brightness are greater as their key depression timing is coming nearer to the current timing. Therefore, it is possible for the player to instantly recognize each key to be depressed and its depression timing, and to comfortably deal with such necessary key depression operation well in advance.

In this second embodiment, the lighting brightness Of the LED to be lit in advance of the current automatic performance timing may be set as exponential function using the number of beat as an exponent so that the brightness becomes greater as the key depression timing approaches. Further, the LED associated with a (nearest) key to be next depressed may be made even more visible by being lit in specially great degree of brightness or lit in different color. Further, the tone of LED lighting color may be varied depending on time differences between keys to be operated.

Further, with the second embodiment, liquid crystal display elements may be used in place of the above-mentioned LEDs, in which case duty ratio applied to the elements may be changed on the basis of the brightness code. Furthermore, the order of performance may be displayed by numerical or alphabetical letters. The standard note used as determining the varying degrees of brightness may be other than the note at the current performance timing, such as the next note or the first note in the phrase. If the first note in the phrase is used as the standard, the manner of indication (degree of brightness) will not change as the performance progresses; nevertheless, the objective of indicating the performance order in the phrase can be accomplished.

[Third Embodiment]

Figure 14:
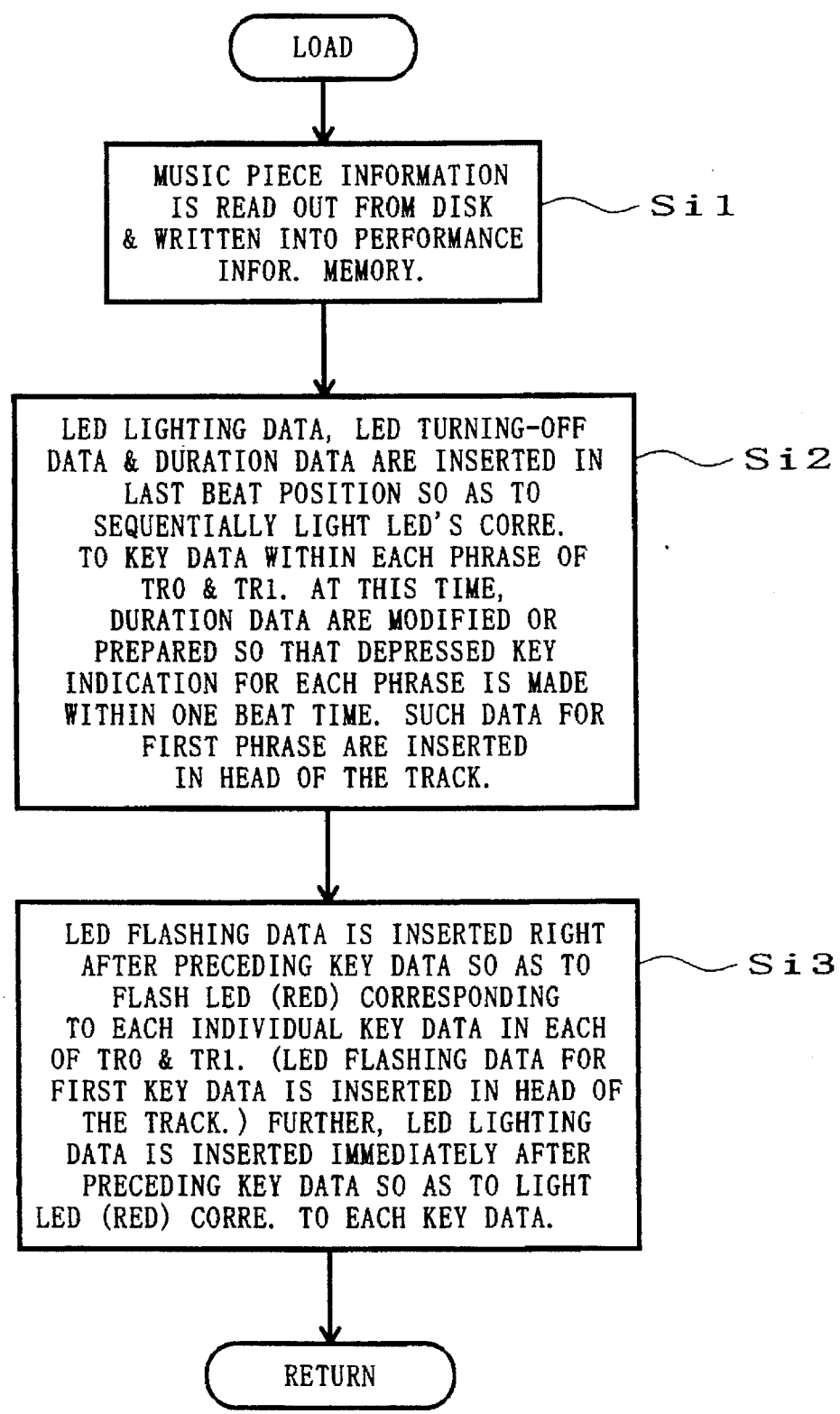
FIG. 14 is a flowchart illustrating still another example (third embodiment) of the load routine of FIG. 5.

The third embodiment to be explained below is characterized in that each key to be depressed in each phrase is displayed by lighting the associated LEDs immediately before the phrase (at the end of the preceding phrase) at a sufficiently fast speed. To this end, the third embodiment performs a load routine of FIG. 14 in place of the load routine of FIG. 6. This third embodiment is similar in basic structure to the first embodiment, but different from the first embodiment in terms of the load routine of FIG. 14 which is triggered upon activation of the load switch. Step Si1 or Si3 will not be described here since they are the same as steps Sb1 or Sb5.

In step Si2, in such a manner that the LEDs corresponding to the key data within each phrase of the performance data for track TR0 are sequentially lit in green, LED lighting data and LED turning-off data are inserted together in a portion corresponding to the last beat of the preceding phrase, and the corresponding duration data is modified or prepared. However, the LED lighting data, LED turning-off data and duration data corresponding to the key data within the first phrase are inserted in the head of the track. The above-mentioned operations are also performed on the performance data of track TR1.

According to the third embodiment, the keys to be depressed within a specific phrase are displayed by lighting the associated LEDs in green in advance at a sufficiently fast speed not greater than one beat, and the key to be next depressed is indicated by flashing the associated. LED in red and then continuously lighting the LED in red upon arrival at the timing to depress the key. Accordingly, it is possible for the player to sensuously know in advance how he should work or position his hands in relation to the key to be next depressed and its depression timing. This allows the player to perform any music piece unfamiliar to him.

The third embodiment has been described above as using the lighting display of LEDs to previously inform keys to be depressed within each phrase, but in an alternative embodiment, such previous information may be made by sound at a sufficiently fast speed. In such a case, time intervals between the key indications need not exactly reflect (or need not be compressed form) of the actual performance timing intervals. The lighting indication may be done quickly at least in accordance with the performance order.

The present invention as has so far been described achieves the following benefits.

Because all performance operators within the entire range to be operated are indicated in advance, the player can instantly recognize the range to be operated and can very comfortably deal with or prepare for such actual performance operations.

Because all performance operators within the entire range to be operated are indicated in advance within a predetermined time before the current performance timing and the manner of previously informing the operation range changes in accordance with time difference between the current performance timing and respect timing to operate performance operators after the current performance timing, the player can instantly recognize each performance operator to be operated and its timing and can comfortably prepare for such an actual performance operation.

Because all performance operators to be operated in each phrase are indicated in advance of the actual reproductive performance of the phrase at a sufficiently faster speed than the actual reproductive performance tempo of the phrase, the player can instantly recognize performance operators to be operated and associated performance operation tempo and thus well prepare for such an actual performance operation.

Because each performance operator to be next operated is indicated in a different manner of indication from other performance operators, the player can know exactly the operator to be next operated and thus well prepare for an actual performance operation of the operator. This allows the player to perform any unfamiliar music piece.

Because reproductive performance is caused to progress in accordance with the player's performance operations, it is possible for the player to do efficient performance practice in an effective manner.

What is claimed is:

1. An electronic musical instrument comprising:

plural performance operators to be used by a player to perform respective notes;

indication means provided in corresponding relations to said performance operators, for indicating said respective notes;

note range information supplying means for, with respect to a given music piece, supplying information representing at least highest-pitch and lowest-pitch ones of said respective notes to be performed in each of plural phrases of the given music piece; and control means for, during performance of the music piece and on the basis of said information sequentially supplied by said note range information supplying means, controlling said indication means to indicate all the ones of said respective notes within a range from the highest-pitch one of said respective notes to the lowest-pitch one of said respective notes for each said phrase.

2. An electronic musical instrument as defined in claim 1 which further comprises performance information supplying means for, with respect to the given music piece, sequentially supplying performance information containing at least note information identifying individual ones of said notes to be performed in the music piece.

3. An electronic musical instrument as defined in claim 2 wherein said performance information supplied by said performance information supplying means further comprises phrase information specifying each of the phrases of the music piece, and wherein said note range information supplying means includes detection means for, on the basis of said performance information supplied by said performance information supplying means, detecting the highest-pitch and lowest-pitch ones of said notes from among said note information for each said phrase specified by said phrase information.

4. An electronic musical instrument as defined in claim 2 wherein said control means, on the basis of said note information sequentially supplied during performance of the music piece by said performance information supplying means, further controls said indication means to indicate at least one of current and next ones of said notes corresponding to current and next performance timing, respectively, in a different manner from other ones of said notes.

5. An electronic musical instrument as defined in claim 4 wherein said control means controls said indication means to indicate both of the current and next ones of said notes in such manners different from each other and also different from said other notes.

6. An electronic musical instrument as defined in claim 2 which further comprises confirmation means for, for each of the phrases, confirming whether ones of said notes corresponding to said note information sequentially supplied during performance of the music piece by said performance information supplying means have actually been performed via said performance operators, and wherein when said confirmation means has confirmed that all ones of said notes of any of the phrases have been performed, said control means controls said indication means to indicate all ones of said notes within a range from a highest-pitch one of said notes to a lowest-pitch one of said notes of a next said phrase.

7. An electronic musical instrument as defined in claim 1 wherein said note range information supplying means includes means for storing information representing at least the highest-pitch and lowest-pitch ones of said notes to be performed in each of the plural phrases of the music piece.

8. An electronic musical instrument as defined in claim 1 wherein said indication means includes visual indicators provided close to said plural performance operators in corresponding relations thereto.

9. An electronic musical instrument comprising:

plural performance operators to be used by a player to perform respective notes;

indication means provided in corresponding relations to said performance operators, for indicating said respective notes;

performance information supplying means for, with respect to a given music piece, sequentially supplying performance information including at least note information identifying plural ones of said notes to be performed in the music piece; and control means for, on the basis of said performance information sequentially supplied by said performance information supplying means, controlling said indication means to indicate a first one of said notes to be performed corresponding to predetermined performance timing, and further controlling said indication means to indicate at least one additional one of said notes to be performed within a given time period after said predetermined performance timing in different manners depending on time differences between respective performance timing of said at least one additional one of said notes and the predetermined performance timing of said first one of said notes.

10. An electronic musical instrument as defined in claim 9 wherein said indication means includes visual indicators provided close to said plural performance operators in corresponding relations thereto, and said control means performs control such that all of said notes to be performed within the given time period are indicated by corresponding ones of said indicators in different degrees of brightness depending on time differences between the respective performance timing of said all of said notes and the predetermined performance timing of said first one of said notes.

11. An electronic musical instrument as defined in claim 9 wherein said first one of said notes corresponding to the predetermined performance timing comprises one of said notes corresponding to current performance timing of said music piece being performed.

12. An electronic musical instrument as defined in claim 9 wherein said first one of said notes corresponding to the predetermined performance timing comprises one of said notes corresponding to performance timing next to current performance timing of said music piece being performed.

13. An electronic musical instrument as defined in claim 9 wherein said performance information supplied by said performance information supplying means contains at least the note information for performing the music piece and phrase information specifying each of the phrases of the music piece, and wherein said control means, for each of the phrases specified by said phrase information, controls said indication means to indicate all ones of said notes to be performed in said phrase in different manners depending on time differences between respective performance timing of said all ones of said notes and the predetermined performance timing of said first one of said notes.

14. An electronic musical instrument as defined in claim 13 wherein said first one of said notes corresponding to the predetermined performance timing comprises one of said notes corresponding to first performance timing in said phrase.

15. An electronic musical instrument as defined in claim 9 wherein said control means, on the basis of said note information sequentially supplied during performance of the music piece by said performance information supplying means, further controls said indication means to indicate at least one of current and next ones of said notes corresponding to current and next performance timing, respectively, in a manner different from other ones of said notes.

16. An electronic musical instrument as defined in claim 15 wherein said control means controls said indication means to indicate both of the current and next ones of said notes in manners different from each other and also different from said other ones of said notes.

17. An electronic musical instrument as defined in claim 9 which further comprises confirmation means for confirming whether ones of said notes corresponding to said note information sequentially supplied during performance of the music piece by said performance information supplying means have actually been performed via said performance operators, and wherein once said confirmation means has confirmed that said all of said notes to be performed have been performed, said control means changes a manner of indication by said indication means.

18. An electronic musical instrument comprising:

plural performance operators to be used by a player to perform respective notes;

indication means provided in corresponding relations to said performance operators, for indicating said respective notes;

performance information supplying means for, with respect to a given music piece, sequentially supplying performance information including at least note information for performing the music piece and phrase information specifying plural phrases of the music piece; and control means for, during performance of the music piece and on the basis of the performance information sequentially supplied by said performance information supplying means, controlling said indication means to indicate, in advance of performance of each said phrase, each of one or more of said notes to be performed in said phrase in accordance with order of performance of said one or more of said notes.

19. An electronic musical instrument as defined in claim 18 wherein said control means controls said indication means to indicate, within a one-beat time of a reproduction tempo of said music piece, the one or more of said notes to be performed in each said phrase in accordance with order of performance of said one or more of said notes.

20. An electronic musical instrument as defined in claim 18 wherein said performance information includes information representing performance timing of each one of said notes to be sequentially performed, and said control means controls said indication means to sequentially indicate individual ones of said notes to be performed in each said phrases at a relatively high speed by compressing intervals between respective performance timing of Said individual ones of said notes.

21. An electronic musical instrument as defined in claim 18 wherein said control means, on the basis of said note information sequentially supplied during performance of the music piece by said performance information supplying means, further controls said indication means to indicate at least one of current and next ones of said notes corresponding to current and next performance timing, respectively.

22. An electronic musical instrument as defined in claim 21 wherein said control means controls said indication means to indicate both of the current and next ones of said notes in manners different from each other.

23. An electronic musical instrument as defined in claim 18 which further comprises confirmation means for, for each said phrase, confirming whether ones of said notes corresponding to said note information sequentially supplied during performance of the music piece by said performance information supplying means have actually been performed via said performance operators, and wherein once said confirmation means has confirmed that all ones of said notes of any of the phrases have been performed, said control means controls said indication means to indicate one or more of said notes to be performed in a next said phrase in accordance with order of performance of said one or more of said notes.

24. An electronic musical instrument as defined in claim 18 wherein said indication means includes visual indicators provided close to said plural performance operators in corresponding relations thereto.

25. An electronic musical instrument as defined in claim 18 wherein said indication means includes means for indicating by sound.

* * * * *